United States Patent [19]

Goldstein et al.

[11] 4,093,771

[45] June 6, 1978

[54] REACTION CURED GLASS AND GLASS COATINGS

[76] Inventors: James C. Fletcher, Administrator of the National Aeronautics and Space Administration, with respect to an invention of, Howard E. Goldstein, Saratoga, Calif.; Daniel B. Leiser; Victor W. Katvala, both of San Francisco, Calif.

[21] Appl. No.: 736,910

[22] Filed: Oct. 29, 1976

[51] Int. Cl.² .................. B32B 5/18; B32B 17/06
[52] U.S. Cl. ........................... 428/312; 65/30 R; 65/60 D; 106/48; 106/54; 427/215; 427/376 A; 427/376 B; 427/379; 427/380; 428/325; 428/331; 428/341; 428/427; 428/428; 428/446; 428/920; 428/406
[58] Field of Search ............ 428/427, 325, 366, 331, 428/388, 389, 312, 428, 341, 920, 406, 446; 252/512, 518, 518.1; 106/54, 48; 65/30 R, 60 D; 427/376 A, 376 B, 379, 380, 215

[56] References Cited

U.S. PATENT DOCUMENTS

| | | |
|---|---|---|
| 3,503,801 | 3/1970 | Huang .................. 428/427 |
| 3,653,862 | 4/1972 | Lynch .................. 428/427 |
| 3,772,043 | 11/1973 | Michael .................. 106/54 |
| 3,839,231 | 10/1974 | Patterson .................. 252/518 |
| 3,929,674 | 12/1975 | Patterson .................. 428/427 |
| 3,948,812 | 4/1976 | Corren .................. 252/518.1 |
| 3,953,646 | 4/1976 | Pechman .................. 106/54 |
| 3,955,034 | 5/1976 | Pechman .................. 106/54 |

*Primary Examiner*—Ellis P. Robinson
*Attorney, Agent, or Firm*—Darrell G. Brekke; John R. Manning

[57] ABSTRACT

The present invention relates to reaction cured glass and glass coatings prepared by reacting a compound selected from the group of substances consisting of silicon tetraboride, silicon hexaboride, other boron silicides, boron and mixtures thereof with a reactive glass frit composed of a porous high silica borosilicate glass and boron oxide. The glassy composites of the present invention are useful as coatings on low density fibrous porous silica insulations used as heat shields and for articles such as reaction vessels that are subjected to high temperatures with rapid heating and cooling and that require resistance to temperature and repeated thermal shock at temperatures up to about 1482° C (2700PF).

14 Claims, 3 Drawing Figures

REACTION CURED GLASS AND GLASS COATINGS

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to reaction cured glass and glass coatings which exhibit high resistance to elevated temperatures and thermal shock which are prepared by reacting a mixture of glasses including a porous high silica borosilicate glass such as Vycor 7930 described in U.S. Pat. No. 2,286,275 and boron oxide with at least one intermetallic or metallic substance selected from a group of compounds consisting of silicon tetraboride, silicon hexaboride, other boron silicides, boron and mixtures thereof.

The reaction cured glass composites of the present invention are particularly useful as thin glazed coatings for porous silica structures such as silica reuseable surface insulation (RSI) a low density porous fibrous rigid insulation and foamed silica in applications at temperatures from −100° C (−150° F) to 1482° C (2700° F). The glassy composites may also be used to form reaction vessels and tubing capable of operating at temperatures around 1260° C (2300° F) while withstanding repeated heating and cooling and thermal shock.

The glassy composites and coatings of the present invention are stable towards devitrification and exhibit good mechanical properties to temperatures in excess of 1092° C (2000° F). The coatings and articles made in accordance with the invention exhibit low thermal expansion coefficients and consequently a high resistance to thermal shock and are of high purity and can provide surfaces with high opacity and emittance, or if desired have transparent or translucent surfaces.

Reaction cured glass coatings in accordance with the invention provide a useful system for coating reuseable surface insulation (RSI) and other porous ceramic bodies. The coated body will exhibit high surface emittance, good resistance to thermal shock, and is inert to air or vacuum environment. The coatings of the invention do not cause excessive shrinkage or distortion of the substrate and do not devitrify or cause devitrification of a silica substrate material even at temperatures around 1260° C (2300° F).

DESCRIPTION OF THE PRIOR ART

In recent years, silica glass, borosilicate glass and aluminosilicate glasses have been employed as coatings for reusable surface insulation. Glass coating compositions of the prior art have generally been multilayer complex systems applied by spraying or brushing and have often required rapid and sometimes repeated firing at temperatures at or above 1260° C (2300° F).

The high temperature (T ≧ 2300° F) firing procedure that is required for these prior art coating systems to maintain a sufficiently low thermal expansion coefficient and to fuse or completely sinter the components have resulted in distortion of the porous substrate. Application of these prior art coating compositions as components of heat shields used in repeated high and low temperature cycles have generally proven unsuitable since the coatings have not maintained a high enough surface emittance to meet space shuttle heat shield requirements and have cracked and otherwise failed after multiple exposures to temperatures at or above 1260° C (2300° F).

The majority of prior art coatings contain emittance agents such as cobalt oxide and silicon carbide which react with convective heating environments to vaporize and in some cases cause the coating to foam and devitrify at high temperatures. The foaming which occurs in prior art coatings lowers their emittance below the requirements for its primary application (space shuttle heat shield) and will ultimately decrease the overall coating strength and contribute to its failure.

Prior art glasses used in applications such as reaction vessels suffer from the disadvantages of not being readily opacified, having a higher thermal expansion coefficient, require higher glazing temperatures and/or have a lower use temperature.

SUMMARY OF THE INVENTION

The present invention provides new glassy-ceramic-metal composites prepared by reacting a mixture of glasses including a porous high silica borosilicate glass such as Vycor 7930 as described in U.S. Pat. No. 2,286,275, made by Corning Glass Works with boron oxide, to prepare a reactive glass frit, which is reacted with one or more of the intermetallic or metallic substances in the group consisting of silicon tetraboride, silicon hexaboride, boron silicides and boron. In some compositions a flux glass such as Corning 7070 glass (a soda borosilicate glass) may be employed. The intermetallic or metallic additives act as emittance agents and are required in the formation of a multicomponent stable glass.

Coatings in accordance with the invention are formed by blending together finely divided particles of the reactive glass frit and intermetallic or metallic compounds with a carrier such as ethanol along with a prebinder such as methylcellulose. The mixture is subsequently applied to a silica surface insulation substrate or any other porous silica substrate or other ceramic substrates and the coating is dried from 2 to 5 hours from about 15° to 70° C. When the carrier also contains water, the drying step can be carried out at a temperature within the range of 20° to 100° C until all carrier liquids are removed. Once dried the coating is glazed in a furnace from 1 to 2 hours at temperatures from about 1000° C (1832° F) to 1400° C (2552° F). During the glazing a chemical reaction occurs between the glass, the intermetallics or metallics and oxygen.

The reaction cured glass compositions of the present invention may be employed to provide a glass that is stable towards devitrification and exhibits good mechanical properties at temperatures in excess of 1092° C (2000° F). The reaction cured glass compositions of the invention consequently may be employed to form reaction vessels for fusing or burning various materials, and as tubing and other articles used in high temperature operations which must possess low thermal expansion coefficients, high thermal shock resistance, high surface purity and high opacity, or transparency.

The reaction cured glass compositions of the present invention are particularly useful as coatings for porous silica structures such as silica reusable surface insulation (RSI) and foamed silica in applications at temperatures from −100° C (−150° F) to 1482° C (2700° F). The coatings of the invention are more easily formed and are more stable morphologically and thermally than prior art coatings. The coatings of the present invention are stable to the environment and do not cause excessive shrinkage or distortion of the substrate during manufacture and eliminate complicated multilayer firing required in coating procedures of the prior art. The present coatings do not cause devitrification of the silica substrate even at temperatures above 1260° C (2300° F) and are crack free, nearly pore free, and waterproof. Reaction cured glass compositions of the invention can be fabricated to closer tolerances because they are glazed (reacted) at lower temperatures than prior art coatings producing a more stable and heat resistant coating. An important feature of the present invention is that it is usable at temperatures higher than its glazing (reaction) temperature.

DESCRIPTION OF THE PREFERRED EMBODIMENT

The advantages of the present invention are achieved by the preparation of glassy composites from a reactive glass frit formed by combining a porous high silica borosilicate glass mixed with boron oxide and reacted with one or more intermetallic or metallic emittance agents selected from the group consisting of silicon tetraboride, silicon hexaboride, other boron silicides and boron. The reactive glass frit is conveniently prepared by blending about two to ten parts of boron oxide with 100 parts of a porous high silica borosilicate glass such as Vycor 7930 glass powder (325 mesh). The Vycor 7930 high silica borosilicate glass is approximately 28% porous and contains 2± 0.5% boron oxide. The preferred composition is usually 2 to 4 percent by weight of boron oxide added to the Vycor 7930. The boron oxide is dissolved in 200 to 400 parts deionized water with the powdered Vycor 7930 glass added to the mixture. This mixture is stirred at about 95° C until a thick paste is formed which is then dried for up to 24 hours at 75° to 95° C. The resulting material is then dispersed, screened and fired at 1149° C (2000° F) for about an hour or more. The resulting sintered composite is ground to a powder and screened through 80 mesh or smaller screen. The resulting reactive glass frit is sintered rather than fused and is a two-phase glass with a very reactive high boron oxide borosilicate glass layer on the outside covering a more refractory low boron content high silica borosilicate glass in the core of each particle.

The original porosity of the 7930 glass is sealed as a result of the sintering process resulting in a substantial shrinkage in the glass particles in a manner well known in the art. The resulting frit formed by the sintering with boron oxide forms a two-phase glass particle which is not readily soluble in water and that can be used to form a coating or glass article by reacting it with an appropriate intermetallic or metallic emittance agent.

Figure 1:
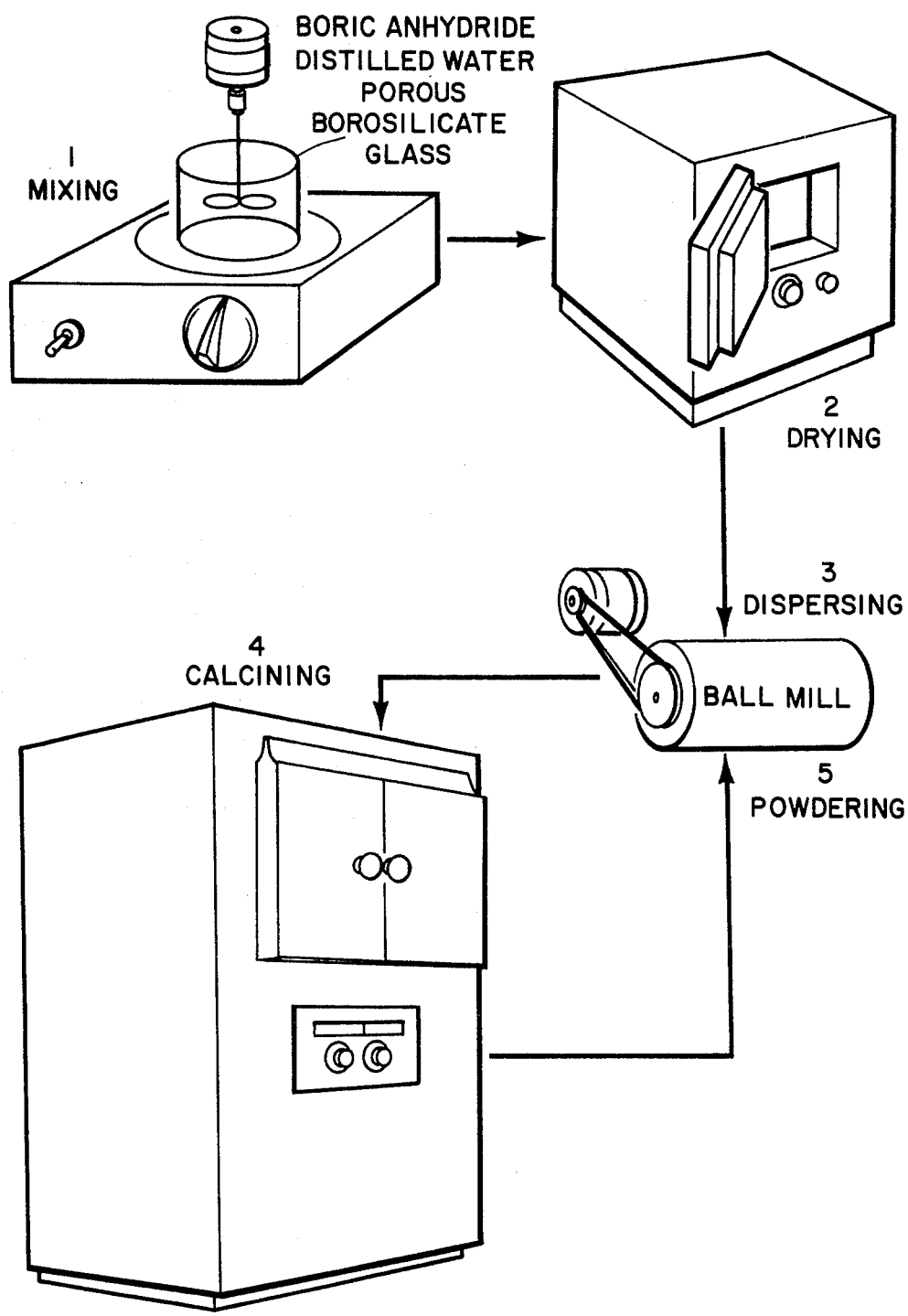
FIG. 1 is a pictorial diagram depicting steps in preparing the reactive frit used in reaction cured glass composites and coatings in accordance with the invention.
Figure 2:
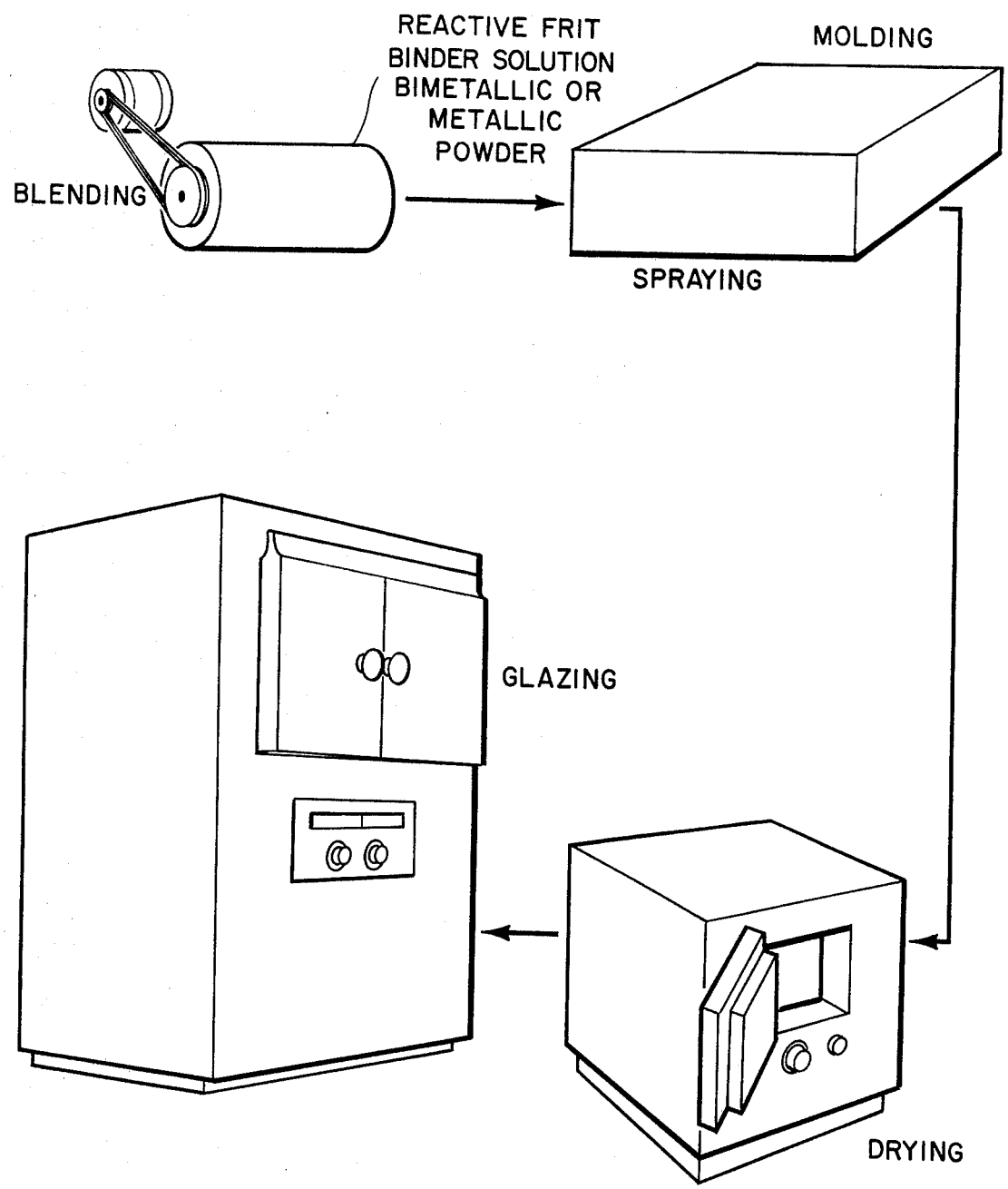
FIG. 2 is a pictorial diagram depicting the procedure for preparing reaction cured glass composites and coatings utilizing the reactive frit prepared in accordance with the invention.
Figure 3:
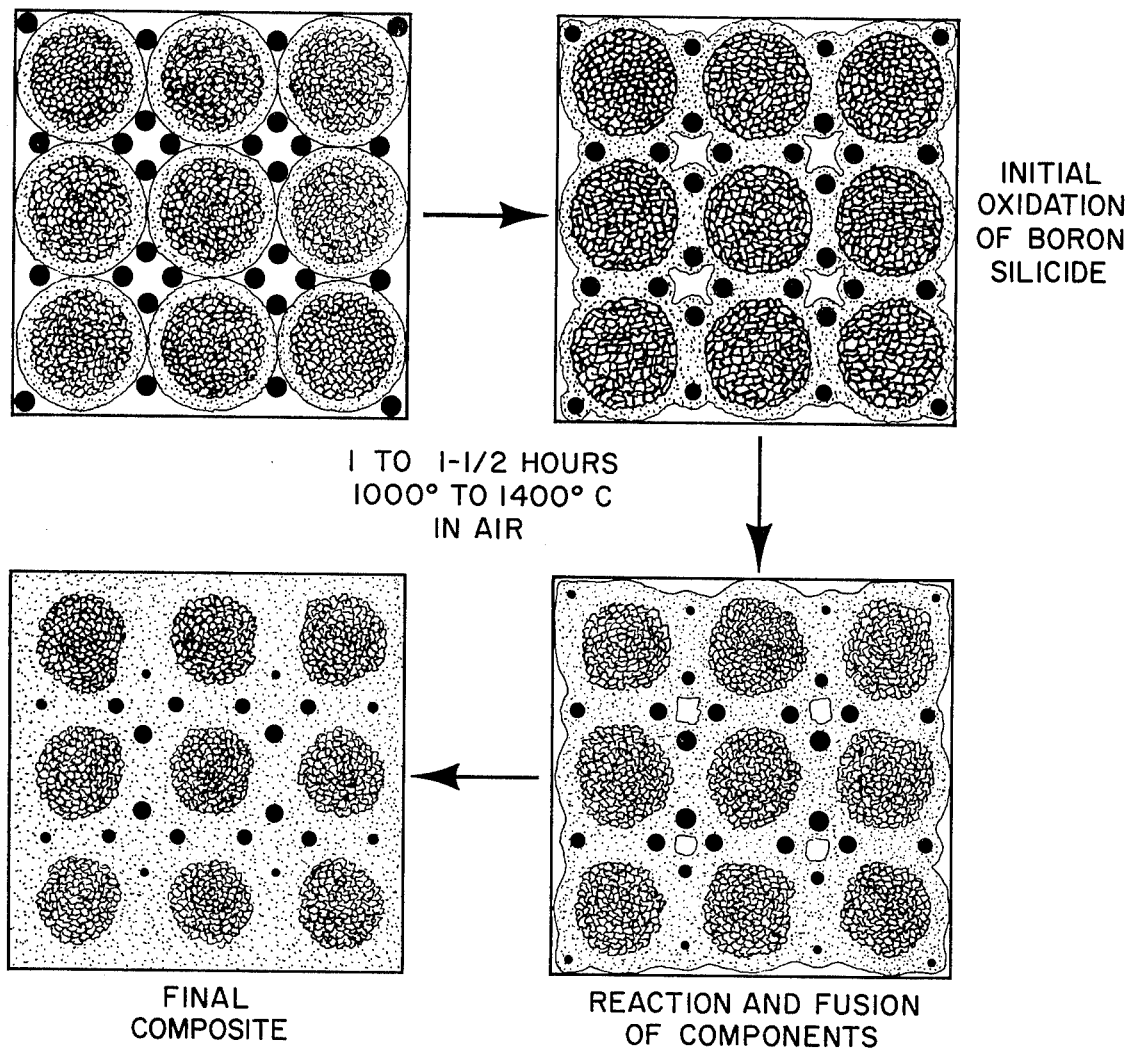
FIG. 3 is a conception of the chemical reaction between the glasses and the intermetallics or metallics during glazing.

The reaction cured glass of the present invention is prepared by reacting the reactive glass frit with one or more intermetallic or metallic substances selected from the group of compounds consisting of silicon tetraboride, silicon hexaboride, other boron silicides and boron. FIG. 3 depicts a conception of the reaction between boron silicide and the boron oxide rich phase of the reactive glass frit and oxygen to form a multiphase intermetallic or metallic glass composite.

In some compositions a flux glass such as Corning 7070 may be added to the reactive mixture to lower the glazing (reaction) temperature or to modify the thermal expansion coefficient. The intermetallic or metallic substances can also act as emittance agents which provide high emittance and react with the frit to form a multicomponent stable glass. The intermetallic or metallic substances are non-volatile and form borosilicate glasses when oxidized in the matrix. The intermetallic or metallic substances are all used in powder form of less than 80 mesh particle size with the proportion of intermetallic substance varying from two tenths of a percent to 6 percent dependent on the required firing temperature and thermal expansion properties desired. One typical composition would be 97.5% reactive glass frit containing 5.5% boron oxide combined with 2.5 percent by weight commercial silicon tetraboride having the elemental composition 63± 3% silicon, 36± 3% boron and less than 0.2% magnesium.

Coatings of the present invention are prepared by blending finely divided particles of the reactive glass frit and silicon tetraboride with a carrier such as ethanol and a prebinder such as methylcellulose in a ratio of 35 to 50% solid components by weight. The carrier solution is prepared by adding a two percent by weight Methocel (A4M) in a water solution to ethanol to get a 0.15 to 0.35% Methocel solution. The mixture of coating components is ball milled in an alumina ball mill with alumina balls for 3 to 12 hours. The ball milled mixture may be sprayed on silica reusable surface insulation (RSI) or any other porous silica structure using an air brush or spray gun. The substrate is generally machined to 0.3% smaller than the required final size to correct for shrinkage and coating thickness. Coatings varying from 0.049 to 0.147 grams per square centimeter (0.1 to 0.3 lbs. per sq. ft.) have been successfully employed. After coating the article is dried for 2 to 5 hours at temperatures ranging from 20° C (room temperature) to about 70° C.

After drying the coated article is glazed in a furnace from 1 to 2 hours at temperatures from about 1092° C (2000° F) to 1231° C (2250° F). A preferred coating composition containing 97.5% reactive glass frit (5.5% boron oxide) and 2.5% silicon tetraboride is glazed for about 1½ hours at 1215° C (2225° F). The furnace employed for glazing should be free of alkali contamination and the coated article should be inserted in the furnace at the glazing temperature and cooled by rapid removal from the furnace to minimize stress in the coating. The coating produced will be opaque and waterproof and will have an emittance of about 0.90 to 0.93 from room temperature to above 1260° C (2300° F). The thermal expansion coefficient will be below $3.9 \times 10^{-7}$ cm/cm/° C.

The intermetallic or metallic compounds employed in the present invention exhibit many advantages as emittance agents over those employed in the prior art. The oxides formed by the emittance agents during the glazing (reaction) of the coatings employed in the present invention are nonvolatile under ordinary conditions and therefore resist bubbling or foaming. Therefore no change in dimensions occurs due to oxidation during glazing or in use. In addition oxides formed by the present emittance agents are borosilicate glasses which react with the borosilicate rich phase of the reactive glass frit. The resulting boron oxide rich phase of the coating prevents devitrification of the more refractory high silica phase glass particles present. Tests performed demonstrate that no devitrification of the preferred coatings of the present invention occurs for at least 800 hours of exposure at 1260° C (2300° F) in air at atmospheric pressure. In addition glass formed by the oxidation of the emittance agents employed forms a protective coating over the remaining intermetallic or metallic particles therefore preventing further oxidation and providing a glass having stable optical properties. As a result of these reactions the glassy ceramic metal composites and coatings can be used at a higher temperature than that at which they were glazed. The emittance of the reaction cured glass of the present invention will not degrade due to further reactions which generally occur between most emittance agents commonly used such as nickel, cobalt and chromium oxides and the environment. These oxides then tend to vaporize in use and cause foaming at high temperatures and low pressures. Other prior art emittance agents such as silicon carbide which heretofore have been employed oxidize to form volatiles which also foam the coating.

The present invention will be further described by way of the following examples to illustrate aspects of the invention which are not intended to limit the scope or applicability of the invention.

EXAMPLE 1

A reactive glass frit is made by adding 68 grams of boric anhydride to 1500 grams deionized water in a 4,000 ml Pyrex beaker and dissolved at about 85° C. To this solution is added 2,200 grams of Vycor 7930 borosilicate glass (325 mesh) and 760 grams of ethanol. The slurry is mixed using an overhead plastic blade mixer while maintaining the temperature at 85° C until the mixture is too thick for further mixing. The slurry is placed in a drying dish and dried for about 16 hours at 70° C until all water and alcohol is removed. The powder is sifted through a 16 mesh screen and placed in a 4,000 ml silica glass crucible. The material is sintered at 1093° C (2000° F) for at least 1 hour in a clean electrically heated furnace. After sintering the glass is crushed and screened through a 325 mesh screen. The resulting reactive glass frit may thereafter be combined with an appropriate intermetallic or metallic compound to form a glass article or coating composition.

EXAMPLE 2

A reactive glass frit is prepared in accordance with Example 1 except that 92 grams of boric anhydride is employed with 2200 grams of Vycor 7930.

In this example a coating is prepared by mixing 43.8 grams of the reactive glass frit prepared with 2.8 grams of Corning 7070 glass, 1.4 grams of silicon tetraboride (99% pure), 0.2 grams of Methocel (A4M) dissolved in 9.8 grams of water and 77.3 grams of ethanol is a size 000 (250 ml) alumina ball mill jar with 1.25 cm alumina cylinders. Ball charge is 50% by (apparent) volume and slurry charge (mill base) is 50% by volume. The ball mill is rolled at 112 rpm for 11 hours. The resulting spray slurry covers 360 sq. centimeters (the top and sides) of an RSI tile with spray using a Binks Wren Type C air brush to a weight of 0.068 ± 0.01 grams per sq. centimeter. The spraying is performed by using clean air or nitrogen at 25 psi. The coated tile approximately 15 × 15 × 2.5 centimeters is glazed in an electrically heated furnace at 1150 ± 10° C for 1½ hours to produce a black waterproof coating.

EXAMPLE 3

A coating slurry for this example is made up and sprayed in accordance with Example 2. A foamed silica substrate of Thermosil, Silfrax, or Glasrock is glazed in the same manner as in Example 2 to obtain a finished coating.

EXAMPLE 4

A reactive glass frit is made up in accordance with Example 1 except that 56 grams of boric anhydride is employed with 2,200 grams of Vycor 7930. The coating is made in the same manner as Example 2 except no Corning 7070 flux is used and 1.2 grams of 99+% pure silicon tetraboride is used with 46.8 grams of reactive glass frit. The mixing and spraying of the slurry on a 15 × 15 × 5 centimeter silica RSI tile is performed in the same manner as Example 2. The coated tile is glazed at 1210° C ± 10° C for 1½ hours to form a black waterproof coating.

EXAMPLE 5

In this example a double layer coating is prepared. A coating is prepared in the same manner as Example 2 except that an additional layer of reactive glass frit containing 4.5% boron oxide and no silicon tetraboride (0.03 grams per square centimeter) is applied over the coating of Example 2, in the same spraying operation.

EXAMPLE 6

A reaction cured glass body is prepared by mixing the components together in the proportions as described in Example 2 and by evaporating the excess alcohol after ball milling to obtain a slurry of the consistency of putty. The material is then molded in appropriate molds in a desired shape and dried at 70° C and cured at 1150° C ± 20° C for 1½ hours. The molded material shrinks approximately 20 linear percent during curing and provides a glossy black waterproof and nearly pore free glass article.

EXAMPLE 7

A coating is made in accordance with a method in Example 4 except that 0.6 grams of boron (200 mesh) is substituted for the 1.2 grams of silicon tetraboride with the remaining procedures in Example 4 being followed to provide a temperature resistant coating for silica reusable surface insulation. This coating is glazed at 1150° ± 10° C for 1½ hours and is translucent and waterproof.

EXAMPLE 8

A coating is made in accordance with the method in Example 7 except 2.4 grams of boron (200 mesh) is substituted for 1.2 grams of silicon tetraboride with remaining procedures of Example 7 followed except the glazing temperature is 1120° ± 10° C. The resulting coating will be black or grey and waterproof.

It will be understood by those skilled in the art that the properties of the coating and glass articles of the present invention may be modified by varying the particle size and components of the reactive glass frit and by varying boric anhydride percentage in the range from 0.1 to 10 percent. Those skilled in the art will also recognize that the coating and articles formed in accordance with the present invention may be modified by combining one or more of the intermetallic or metallic compounds in varying percentages with the reactive glass frit.

The present invention therefore may be implemented in a variety of ways by those skilled in the art to suit a particular requirement. It will be understood that these and various other changes substitutions may be made by those skilled in the art which are in the spirit and scope of the invention and as defined in the appended claims.

What is claimed is:

1. A reaction cured glass ceramic-metal composition comprising the reaction product of:
    (a) the reaction of about two tenths to about 6 percent by weight of a less than about 80 mesh powder of a substance selected from the group consisting of silicon tetraboride, silicon hexaboride, boron silicides, boron and mixtures thereof, with;
    (b) finely divided particles of a reactive glass frit prepared by combining two tenths of a part to 10 parts boron oxide with 100 parts of a porous high silica borosilicate glass wherein said glass frit is sintered rather than fused and is a two-phase glass with a very reactive high boron oxide borosilicate glass layer on the outside covering a more refractory low boron content high silica borosilicate glass in the core of each particle.

2. The reaction cured glass ceramic-metal composition of claim 1 additionally comprising a flux glass to modify the thermal expansion coefficient.

3. The reaction cured glass ceramic-metal composition of claim 1 wherein said reactive glass frit is prepared by combining from about 2 to about 4 percent by weight of boron oxide with said porous high silica borosilicate glass.

4. The reaction cured glass ceramic-metal composition of claim 1 wherein said reactive glass frit is a powder of less than about 80 mesh particle size.

5. The reaction cured glass ceramic-metal composition of claim 1 wherein said porous high silica borosilicate glass is a Vycor porous glass powder.

6. A high temperature resistant article comprising a reaction cured glass coating composition resulting from the process of:
    (a) reacting about two tenths of a percent to about 6 percent by weight of a less than about 80 mesh powder of a substance selected from the group consisting of silicon tetraboride, silicon hexaboride, other boron silicides, boron and mixtures thereof, with a finely divided particulate reactive glass frit prepared by combining two tenths of a part to 10 parts of boron oxide with 100 parts of a porous high silica borosilicate glass wherein said glass frit is sintered rather than fused and is a two-phase glass with a very reactive high boron oxide borosilicate glass layer on the outside covering a more refractory low boron content high silica borosilicate glass in the core of each particle;
    (b) blending the reaction product in a ball mill with a carrier solution and a prebinder in a ratio of 35 to 50 percent by weight solid components to provide a coating slurry;
    (c) applying said coating slurry to a porous silica glass substrate or a ceramic substrate;
    (d) drying said coating at about 20° to about 100° C; and
    (e) glazing said coating for about one half to two hours at about 1000° to about 1400° C, by inserting the coated substrate into the furnace at temperature and removing it rapidly after glazing.

7. The reaction cured glass coating in claim 6 additionally comprising a flux glass added to said substance and reactive glass frit.

8. The reaction cured glass coating of claim 6 wherein said reactive glass frit is prepared by combining 2 to 4 percent by weight boron oxide with said porous high silica borosilicate glass.

9. The reaction cured glass coating of claim 6 wherein said reactive glass frit is a powder of less than about 80 mesh particle size.

10. The reaction cured glass coating of claim 6 wherein said carrier solution is ethanol and said prebinder is methylcellulose.

11. The reaction cured glass coating composition of claim 6 wherein said porous high silica borosilicate glass is a Vycor porous glass powder.

12. The reaction cured glass coating of claim 6 wherein the final coating weight is 0.049 to 0.147 gm/cm$^2$.

13. The article of claim 6 wherein the coating is applied to silica structures such as low density porous fibrous insulation and foamed silica of densities from 7 to 30 pounds per cubic foot.

14. The process of claim 6 wherein the components are blended for 3 to 12 hours in a ball mill.

* * * * *